United States Patent
Burdin et al.

(10) Patent No.: US 7,020,725 B2
(45) Date of Patent: Mar. 28, 2006

(54) METHOD OF RESERVING ISOCHRONOUS RESOURCES IN A NETWORK COMPRISING A WIRELESS LINK

(75) Inventors: Nicolas Burdin, Rennes (FR);
Sébastien Perrot, Rennes (FR);
Christophe Vincent, Gahard (FR)

(73) Assignee: Thomson Licensing,
Boulogne-Billancourt (FR)

( * ) Notice: Subject to any disclaimer, the term of this patent is extended or adjusted under 35 U.S.C. 154(b) by 132 days.

(21) Appl. No.: 10/399,366

(22) PCT Filed: Oct. 18, 2001

(86) PCT No.: PCT/EP01/12334

§ 371 (c)(1),
(2), (4) Date: Oct. 2, 2003

(87) PCT Pub. No.: WO02/33903

PCT Pub. Date: Apr. 25, 2002

(65) Prior Publication Data

US 2004/0047363 A1    Mar. 11, 2004

(30) Foreign Application Priority Data

Oct. 19, 2000   (EP) ................................. 00402908

(51) Int. Cl.
*G06F 13/00*   (2006.01)
*G06F 13/14*   (2006.01)
(52) U.S. Cl. ...................... 710/200; 710/108; 709/253; 370/395.2
(58) Field of Classification Search ................ 710/108, 710/307, 305, 200; 709/253, 227, 229; 711/100; 455/434, 450, 438; 370/443, 236, 355, 395.2
See application file for complete search history.

(56) References Cited

U.S. PATENT DOCUMENTS 6,028,840 A * 2/2000 Worster ...................... 370/230
6,563,793 B1 * 5/2003 Golden et al. .............. 370/236

FOREIGN PATENT DOCUMENTS

WO    00/31911    6/2000
WO    01/56226    8/2001

OTHER PUBLICATIONS

"The Navy's Use of Digital Radio" by Schoppe, W. (abstract only) Publication Date: Dec. 1979.*
"Broadband Radio Access Networks (Bran); Hiperlan Type 2; Packet Based Convergence Layer; Part 3: IEEE 1394 Service Specific Convergence Sublayer (SSCS)", ETSI TS 101 493-3 V1.1.1, Sep. 2000, pp. 1-74.

* cited by examiner

*Primary Examiner*—Gopal C. Ray
(74) *Attorney, Agent, or Firm*—Joseph J. Laks; Robert D. Shedd; Paul P. Kiel

(57) ABSTRACT

A method for reserving an isochronous resource over a link between a first bus and a second bus, the link including a first interface device connected to the first bus and a second interface device connected to the second bus. The reservation of the resources over the link is transparent to the devices connected to the busses. The method includes, at the level of the interface devices, intercepting the connection set up messages sent by the devices connected to the busses, checking whether a source device and a sink device for which the set-up message has been intercepted are on different busses, and in the affirmative, reserving resources for the connection over the link.

11 Claims, 5 Drawing Sheets

Figure 1:
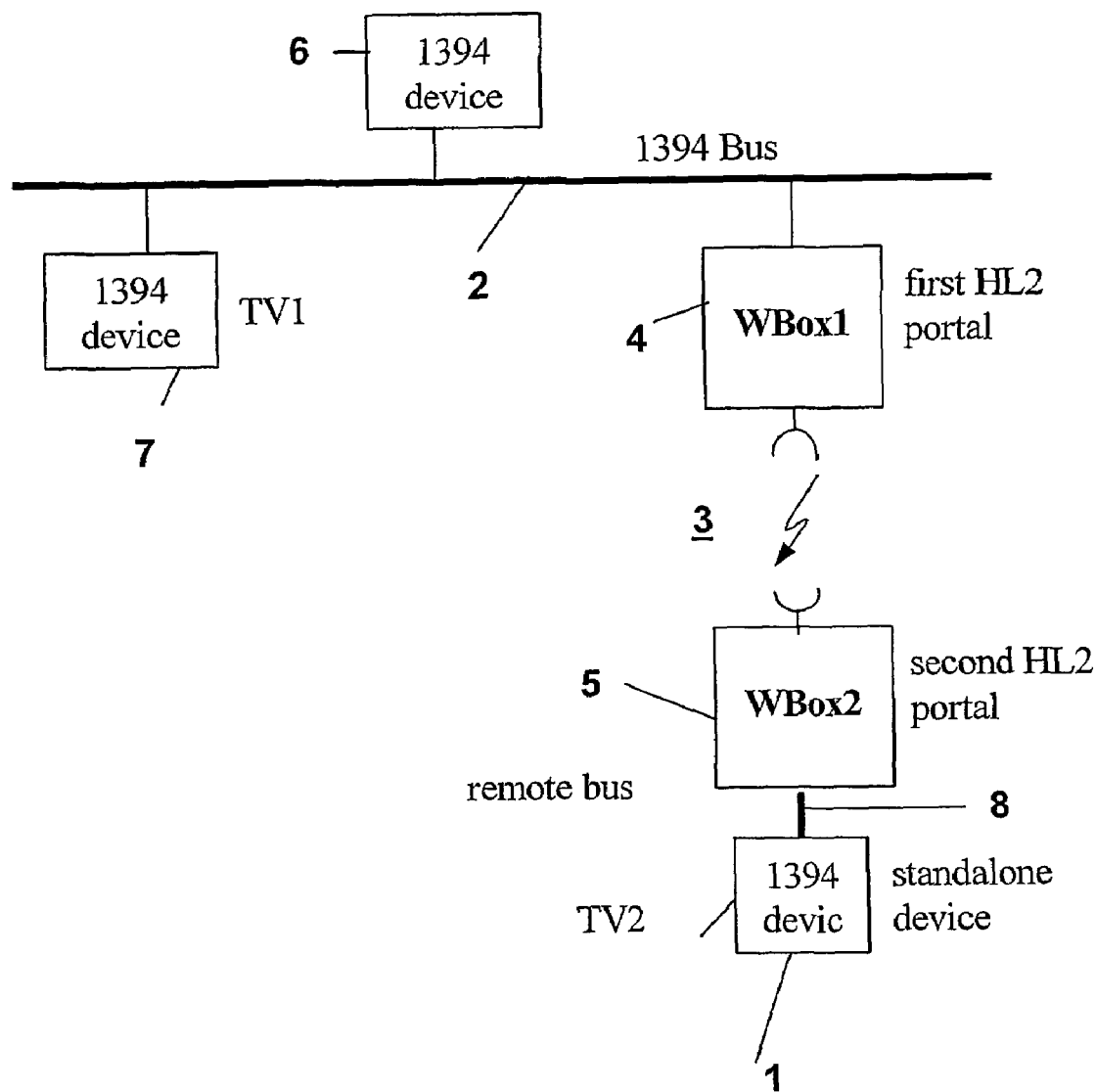

| On-line | Broadcast connection counter | Point to point connection counter | Direction | Channel number | Data rate | Overhead ID | Payload |
|---------|------------------------------|-----------------------------------|-----------|----------------|-----------|-------------|---------|
| 1 | 1 | 6 | 2 | 6 | 2 | 4 | 10 |

Fig. 5

METHOD OF RESERVING ISOCHRONOUS RESOURCES IN A NETWORK COMPRISING A WIRELESS LINK

This application claims the benefit, under 35 U.S.C. § 365 of International Application PCT/EP01/12334, filed Oct. 18, 2001, which was published in accordance with PCT Article 21(2) on Apr. 25, 2002 in English and which claims the benefit of European patent application No. 00402908.8, filed Oct. 19, 2000.

The invention concerns a method for reserving isochronous resources, such as bandwidth, in a network comprising a wireless link. In particular, the invention applies to IEEE1394 busses connected through a wireless link constituted by a BRAN Hiperlan2 network as defined by ETSI.

The management of the isochronous resources in a Serial Bus is covered by the Isochronous Resource Manager ('IRM') function described in the IEEE1394-2000 standard. The IRM is not really in charge of allocating bandwidth and channel but rather provides a single location where other nodes record their use of isochronous resources.

The IEC 61883 standard specifies the transmission protocol for audiovisual data between equipment connected to an IEEE 1394 Serial Bus. It also specifies a protocol ('CMP' for Connection Management Procedures) so that nodes can access the IRM to reserve bus resources.

As specified by this protocol, when a bus reset occurs on a single serial bus, the following actions are performed:

All Audio/Video devices which had connected input and output plugs prior to the bus reset shall continue to receive, respectively transmit isochronous data after the bus reset, during one second, according to values present in the Plug Control Registers ('PCRs') immediately before the bus reset. The Plug Control Registers are defined by IEC 61883.

Controllers which established connections before the bus reset have one second to reclaim resources. Non-reclaimed resources are released by the IRM one second after the bus reset.

One second after the bus reset, all Audio/Video devices which had connected input and output plugs prior to the bus reset shall behave according to the values in the corresponding plug control registers (these values may have been updated by some controllers in the meantime).

This procedure guarantees that a bus connection established by a device (or application) is released if this device disappears and obviously if the source or the destination node disappears.

It means that, after a bus reset, the isochronous streams are reestablished according to the presence or absence of the devices involved in the connections.

When two wired IEEE1394 busses are linked through a wireless connection, the procedures defined by IEC 61883 and IEEE1394 are insufficient to determine the behavior of the different entities in the network when it comes to reserve resources on both sides of the wireless link.

The European patent application 00402941.0 of Oct. 19, 2000 filed in the name of THOMSON Licensing S.A. concerns other aspects of a wireless bridge, in particular handling of bus resets.

The invention concerns a method for reserving an isochronous resource over a link between a first bus and a second bus, said link comprising a first interface device connected to the first bus and a second interface device connected to the second bus, said link being transparent to devices connected to the busses, said method comprising the steps, at the level of the interface devices, of:

intercepting connection set-up messages sent by devices connected to the busses;

checking whether a source device and a sink device of a connection for which a set-up message has been intercepted are on different busses; and in the affirmative, reserving resources for the connection over the link.

Figure 2:
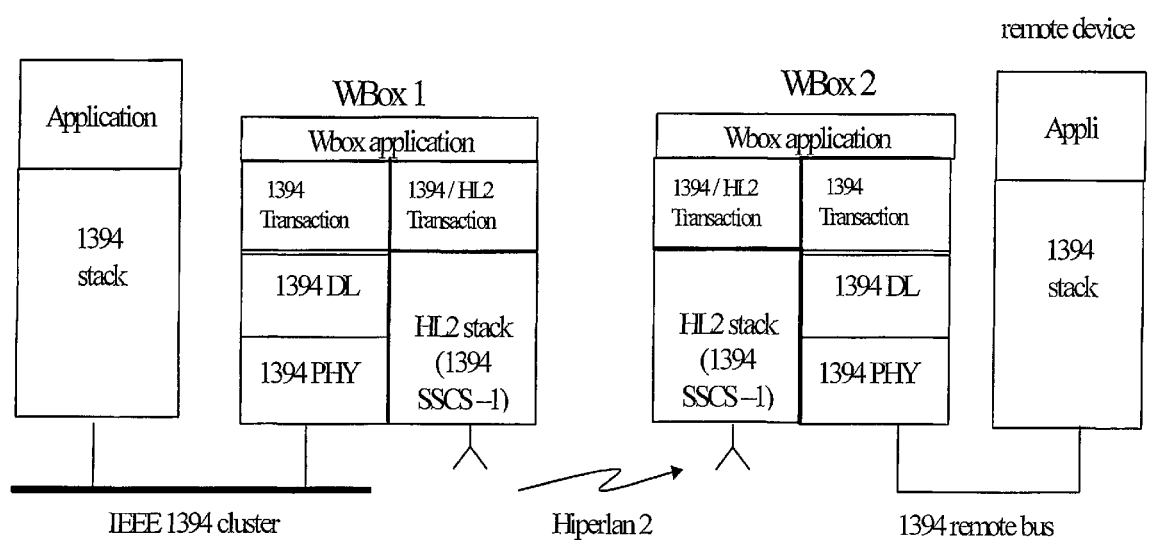
Figure 3:
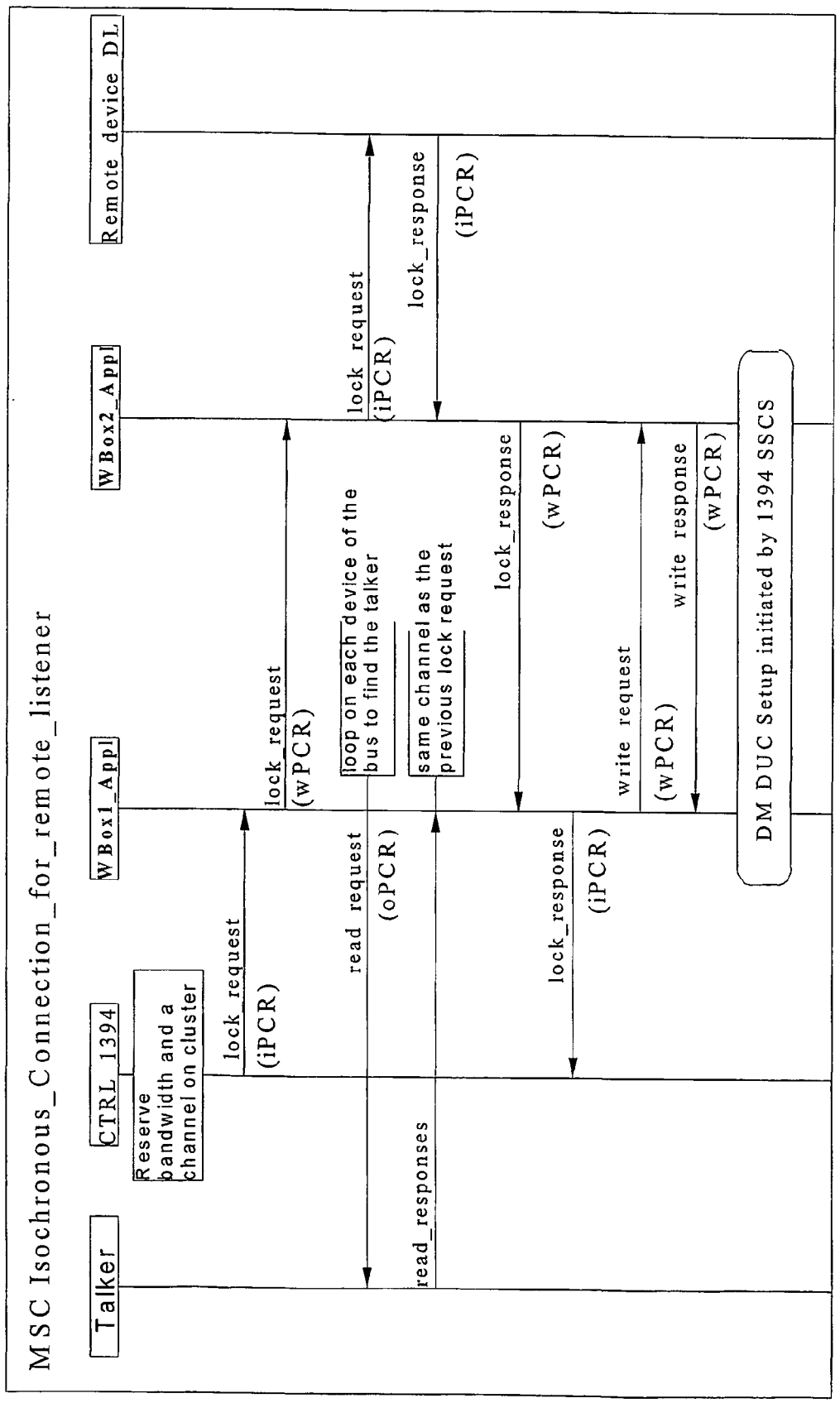
Figure 4:
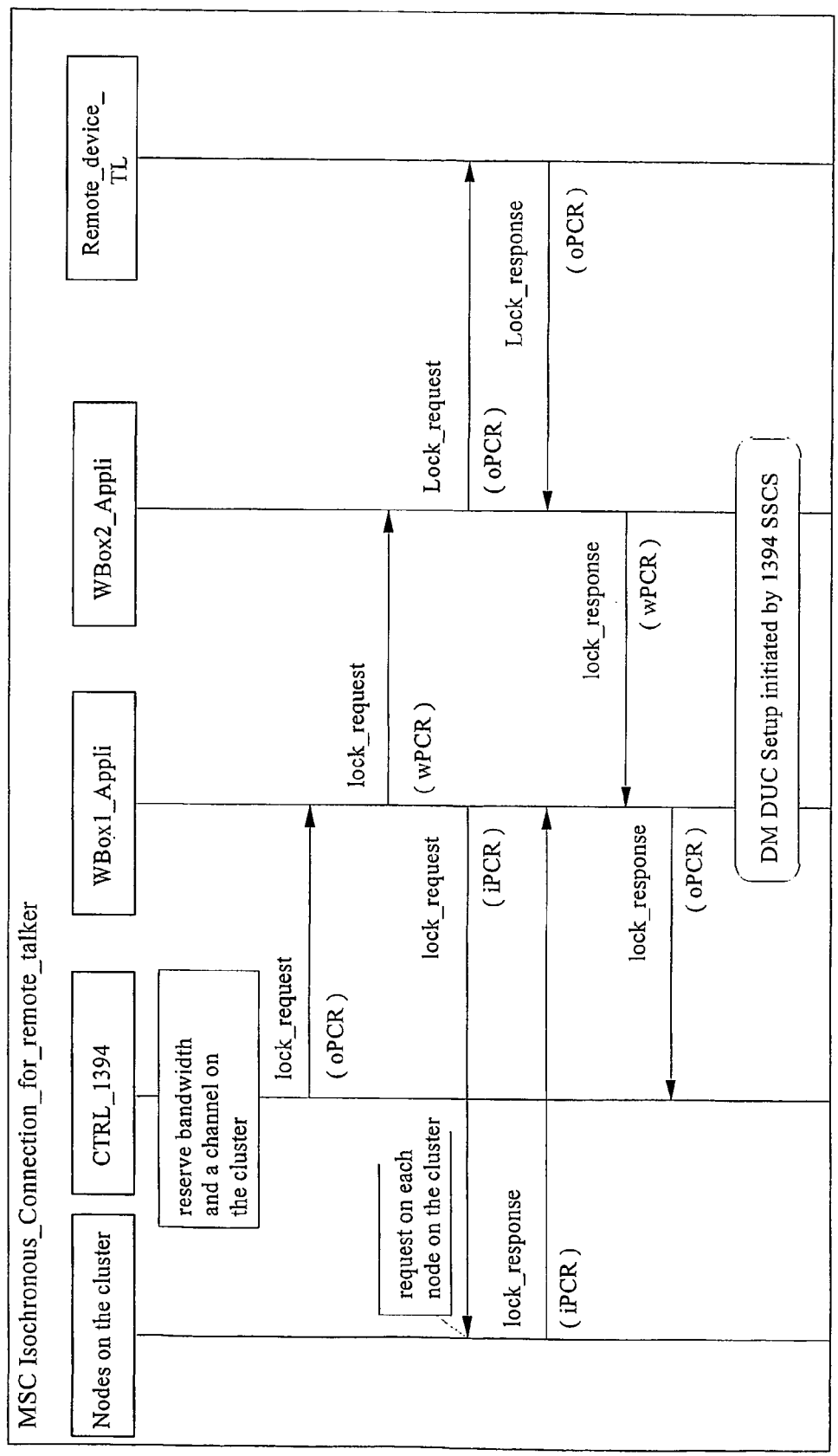

Other characteristics and advantages of the invention will appear through the description of a non-limiting embodiment, explained with the help of the enclosed drawings, among which FIG. 1 is a schematic diagram of a network including a wireless link, FIG. 2 is a diagram of the protocol stacks of the different devices of the network, FIG. 3 is a message sequence chart describing the exchange of messages for the lock procedure of an iPCR register in a remote device, FIG. 4 is a message sequence chart describing the exchange of messages for the lock procedure of an oPCR register of the remote device, FIG. 5 is a diagram of a register defined for the present embodiment, and named the wireless Plug Control Register ('wPCR').

More information concerning the background of the embodiment can be found in the following documents, available from the corresponding standardization organizations:

[1] IEC61883, Digital Interface for consumer Audio/Video Interface.

[2] IEEE Std 1394-2000, Standard for a High Performance Serial Bus.

The present example is based on the IEEE 1394-1995 standard for a serial cable bus, and on the ETSI BRAN Hiperlan 2 project for wireless communication. For the latter, reference is made to the document cited in the introduction: 'Broadband Radio Access Networks (BRAN); HIPERLAN Type 2; Packet based convergence layer; Part 3: IEEE 1394 Service Specific Convergence Sublayer (SSCS) ", version 1.1.1 of September 2000. This document addresses the transport of IEEE 1394 traffic between Hiperlan 2 devices.

FIG. 1 represents an example of a network in which an IEEE1394 device 1 is connected to an IEEE1394 wired bus 2 through a wireless connection 3. The wireless connection is formed by two devices 4 and 5, respectively labeled "WBox1" for the device connected to the wired bus 2 and "WBox2" for the device connected to the 1394 device 1. Typically, standalone device 1 may be a consumer electronics device such as a television receiver or satellite or cable decoder. Two further devices, 6 and 7, are connected to the bus in a known fashion. The devices 6, 7 and WBox1 form what will be called a 'cluster' in the rest of the description.

FIG. 2 illustrates the protocol stacks in the devices "WBox1" and "WBox2". WBox1 communicates with bus 2 using the IEEE 1394 protocol stack, i.e. the physical layer, the link layer and the transaction layer. The same is true for WBox2 and the device 1. Lastly, WBox1 and WBox2 communicate using the Hiperlan 2 protocol stack as defined in the document ETSI BRAN IEEE 1394 SSCS document mentioned earlier.

According to the present embodiment, the bridge formed by the wireless link is 'transparent', i.e. the network behaves as if there were only a single bus, to which all nodes are connected.

Depending on the location of the controller, the talker (i.e. the source of an isochronous stream) and the listener(s) (i.e. receivers or sinks of an isochronous stream), different scenarios are defined to reserve the bandwidth on the radio link and on each bus.

For example, if the talker is located on the cluster and the listener is located in the remote device, wireless resources will have to be reserved.

On the other hand, if the talker and the listeners are on the cluster, no radio (i.e. wireless) reservation will be necessary.

To determine the location of talker and listener, Wboxes intercept lock messages on Plug Control Registers ('PCRs') that are sent across the radio link, from one bus to the other. The Wboxes also check the plug control registers of nodes on the buses to decide whether to establish or to break isochronous connections over the radio link.

First, a controller reserves a channel and bandwidth by issuing a lock request on the CHANNEL_AVAILABLE and BANDWIDTH_AVAILABLE registers of the Isochronous Resource Manager. This is independent of the location of the controller and of the IRM of the bus. If the reservation succeeds, the controller obtains a channel number.

Note that since the bridge is transparent to IEEE 1394 devices, there exists only one IRM for both busses.

The next step that the controller takes is to program the output plug control register ('oPCR') of a talker node and the input plug control register ('iPCR') of a listener device, using the channel number and the bandwidth.

The lock request messages on the PCRs (including the establishment, the overlaying and the breaking of a point-to-point connection) that are sent to devices across the radio link are intercepted by the wireless devices. Other lock messages are not processed by the wireless devices, i.e. are only being forwarded over the radio link.

When Wbox1 receives a lock request from the cluster, it sends it to the remote device 1. Wbox1 needs to know if it is necessary to reserve (or to release) a channel on the radio.

No reservation is performed on the radio until there is a listener or a talker on both sides of the radio link.

The different scenarios are defined below:
If the talker and the listeners are on the same cluster, no reservation on the radio link is performed.
If the talker and a listener are on different clusters, a radio link reservation is necessary.

In what follows, the behavior of the Wbox will first be described (sections 1 and 2) in the case no channel has been allocated for a connection (i.e. the new connection is not laid over an existing connection).

Note also that in the present embodiment, the location of the controller of a connection (i.e. the node which creates the connection by issuing appropriate lock requests) determines the wireless box which will make the reservation over the link, if such a reservation is required: the wireless box making the reservation is connected to the same bus as the controller.

1. The controller sends a Lock Request on an iPCR Register 1.1 The Controller is a Node of the Cluster The controller sends a lock request on the iPCR of a device located on the remote bus. It is intercepted by Wbox1 and forwarded to the remote device through Wbox2. The remote device then sends back the lock response to the controller. Wbox1 also intercepts this lock response in order to check whether the reservation succeeded or not. If the reservation did not succeed, no radio channel is reserved.

If the reservation in the iPCR succeeded, the following steps are taken:

When the WBox1 receives the iPCR lock request from the remote device and forwarded by Wbox2, Wbox1 examines the oPCR of each device of the cluster to determine whether a talker exists for this connection, by checking the channel number in the oPCR registers for the channel number used with the iPCR. The bandwidth information available in the oPCR is necessary to reserve the channels on the wireless link.

If a talker is found, then the Wbox1 reserves a channel on the radio. If there is not enough bandwidth on the radio link, the SSCS layer of WBox1 reserves a reduced bandwidth. The user will eventually observe a deteriorated connection and will act in consequence (e.g. he stops the service).

If no talker is found, no radio link reservation is made. Nevertheless, Wbox1 watches the oPCR of each node of the cluster until it finds the talker for this connection.

The process is illustrated by FIG. 3. Note that the method used to transmit the lock request over the wireless link will be described later, in relation with the so-called 'wireless plug control register' ('wPCR').

Due to the fact that the wireless link is transparent to IEEE 1394 devices, the controller never has any information as to whether the reservation on the wireless link succeeds or not. This is only observed by the user.

1.2. The Controller is the Remote Device

The controller is located in the remote device and it sends a lock request to a node located in the cluster. The lock is intercepted by the Wbox2 and the mechanism is the same as above. The difference is that the Wbox2 has only to watch the oPCR register of the remote device, since according to the present example, there is only one node on the remote bus.

Moreover, if Wbox2 intercepts a lock request on the oPCR of a node located on the cluster, which is related to the listener on the cluster (i.e. same channel number), it stops watching the oPCR of the remote device, since it then knows that both the listener and the talker are on the cluster. This verification may also be done by Wbox1. It may also be applied whatever the location of the controller.

2. The Controller Sends a Lock Request on an oPCR Register 2.1. The Controller is a Node of the Cluster The controller sends a lock request on the oPCR of the remote device. The Wbox1 intercepts the lock request and forwards it to the remote device. It then intercepts the lock response from the remote device that allows it to know if the reservation in the oPCR has succeeded or not. If it has not succeeded, no reservation is necessary on the radio link.

If the lock request of the oPCR register succeeded, the following occurs (see FIG. 4):

Wbox1 reads the iPCR of each node of the cluster to determine whether a listener exists for this connection.

If a listener is found, a reservation of a channel on the radio link is required and is performed by Wbox1.

If no listener is found, no radio link reservation is necessary. But the wireless device WBox1 has to check continuously if a listener has been created on the cluster for this connection. If it finds one, a reservation on the radio link is necessary. As previously, if the wireless box can deduce from the lock requests it receives that the talker and the listener are on the same bus, it stops the monitoring of the iPCRs.

2.2 The Controller is the Remote Device

The mechanism is the same as above; the Wbox2 has only to watch the remote device.

3. Release of the Radio Reservation

By analyzing the lock requests for existing reservations over the wireless link, the wireless boxes determine whether a connection between a talker and a listener is released, and whether this release requires release of resources over the wireless link.

4. Bandwidth Modification

From time to time (e.g. periodically), the wireless device Wbox1(respectively Wbox2) reads the oPCR register of the talkers of connections involving wireless resources, in order to detect any modification of the bandwidth. When Wbox1 (resp. Wbox2) detects that the bandwidth has been modified in the oPCR of the talker on the cluster (resp. the remote bus), it modifies the bandwidth on the wireless link, by appropriately increasing or decreasing it.

In case the WBoxes find that a talker is not active any more (i.e. its oPCR has been modified accordingly by a controller and it does not transmit data any more), the corresponding wireless channel is released.

To summarize the behavior:

Wbox1 watches the nodes of the 1394 cluster in the following cases.

When it intercepts a lock request in the iPCR of the remote device, it needs to know which node is the talker for this connection and what is the allocated bandwidth for the streams coming from the talker. Once it has found the talker on the cluster, it reserves a channel on the wireless link.

When it receives a lock request on the oPCR of the remote device, it needs to know if there is at least one listener on the cluster for this connection.

Wbox2 sends read requests to all the nodes of the cluster until it finds the one it is looking for. The read requests may be sent every second, for example. The node containing in its oPCR (respectively iPCR) the same channel value as the initial lock request is the talker (respectively a listener) of this connection.

The same applies symmetrically to Wbox2.

Each Wbox monitors its cluster to determine whether a connection is to be established (further to a lock request interception), or whether an existing connection is to be modified. This watching is limited to the cluster and does not use the wireless channel.

When it is necessary (the talker and a listener are connected to different busses) a channel is reserved on the wireless link. The Wbox making the reservation knows the bandwidth necessary for the connection (it reads it from the oPCR register) and the direction of the connection (depending on the location of the talker). It can then reserve a channel on the wireless link.

The behavior of the wireless devices in case of a broadcast connection will now be described. A node may itself decide whether to put an input or output plug into this state. In other words, it may happen that no corresponding PCR lock requests circulate on the network.

When Wbox2 detects (through systematic monitoring of the PCRs) that the value of the broadcast connection counter field of an oPCR (resp. iPCR) of the remote device has been set to one, it informs Wbox1. This means that a broadcast-out (resp. broadcast-in) connection to the output (resp. input) plug exists, as defined in IEC 61883.

Wbox1 then watches on the cluster if a broadcast-in (broadcast-out) connection exists on the same channel as that indicated in the oPCR (resp. iPCR), by watching all the iPCRs (resp. oPCRs) of all the nodes on the cluster. If it finds such a connection, it reserves a channel on the wireless link.

When Wbox2 detects that the value of the broadcast connection counter field of an oPCR (resp. iPCR) of the remote device has been set to zero, it informs Wbox1. This means that the broadcast-out (broadcast-in) connection to the output (input) plug does not exist any more.

Wbox1 then releases the channel on the wireless link.

The process for Wbox2 is symmetrical.

According to the present embodiment, a register called the wireless Plug Control Register ('wPCR') is defined in the HiperLan 2 transaction layer of the wireless devices. The register is used to transmit information between Wbox1 and Wbox2.

The register's contents are defined by FIG. 5.

The fields are the same as into the oPCR register, as defined in the IEC 61883 document, except that the 'reserved' field of the oPCR is replaced by a field indicating the direction of the data flow. Of course another implementation could be used, but preferably this implementation close to the PCR format defined by IEC 61883 is used.

When Wbox1 intercepts a lock request in the oPCR, as previously defined, it sends a lock request on the wPCR of Wbox2. The direction field is set to 0, indicating that the lock request concerns an oPCR register. If a channel needed to be reserved on the wireless link, the flow would be from Wbox2 to Wbox1. The application of Wbox2, which acts as a controller, can then send a lock request on the oPCR of the remote device, and on the iPCR of the IEEE 1394 transaction layer of Wbox2.

When Wbox1 intercepts a lock request on the iPCR as previously described, it sends a lock request on the wPCR of Wbox2. The direction field is set to 1, to indicate that the lock request concerns an iPCR register. If a channel needed to be reserved on the wireless link, the data would flow from Wbox1 to Wbox2. The application of Wbox2 can then send a lock request on the iPCR of the remote device to initiate the connection.

Wbox2 receives a write request on the wPCR from Wbox1, once the talker has been found on the cluster. The application of Wbox2 can then send a lock request on the oPCR of the IEEE 1394 transaction layer of Wbox2 to set up the trunk of the connection on the remote bus.

WPCR registers are defined in a similar manner for Wbox1.

It is to be noted that although the present embodiment concerns a wireless link between busses, the principles of the invention can be applied to other types of links, in particular wired links.

What is claimed:

1. Method for reserving an isochronous resource over a link between a first bus and a second bus, said link comprising a first interface device connected to the first bus and a second interface device connected to the second bus, said method comprising the steps, at the level of the interface devices, of:

intercepting connection set-up messages sent by devices connected to the busses;

checking whether a source device and a sink device of a connection for which a set-up message has been intercepted are on different busses; and in the affirmative, reserving resources for the connection over the link, said link being transparent to devices connected to the busses.

2. Method according to claim 1, wherein a connection set-up message is a lock request for a plug control register of a device connected to one of the first and second bus.

3. Method according to claim 2, wherein the checking step is carried out by a given interface device if the given interface device received a lock request concerning plug control register of a device on a remote bus from a connection controller on the given interface device's local bus.

4. Method according to claim 2, wherein the checking step comprises, following reception by a given interface device, of a lock request on an input plug control register, respectively output plug control register, monitoring output plug control plug registers, respectively input plug control registers, of devices on the given interface device's local bus for determining the existence of a plug control register containing a channel number equal to a channel number indicated in the lock request.

5. Method according to claim 4, further comprising monitoring of plug control registers periodically.

6. Method according to claim 5, wherein monitoring of plug control registers is stopped by an interface device in case the interface device detects that a source device and a sink device of a connection are on a same bus.

7. Method according to claim 6, wherein the fact that a source device and a sink device for a connection are on a same bus is checked by intercepting a lock request on a plug control register having same channel number as the initial lock request and destined to a device on the same bus as the initial lock request.

8. Method according to claim 2, further comprising the steps, by an interface device and for an existing connection crossing the link reserved by the interface device, of detecting changes of the bandwidth required for this connection by monitoring the output plug control register corresponding to the existing connection;

modifying the resource reservation over the link for the existing connection, as a function of a bandwidth change in the output plug control register.

9. Method according to claim 1, further comprising the step of providing in each interface device a specific register for write access by the other interface device, wherein each interface device writes to the specific register of its peer device the direction of flow indicated by a lock request on a bus, and wherein the writing to the register triggers transmission of a corresponding lock request on the local bus of the interface device containing the specific register.

10. Method according to claim 1, wherein the link is a wireless link.

11. Method according to claim 10, wherein the wireless link is a Hiperlan 2 network.

* * * * *